United States Patent [19]

Goel

[11] Patent Number: 4,568,704

[45] Date of Patent: Feb. 4, 1986

[54] PHENOL-FORMALDEHYDE BASED URETHANE FOAMS

[75] Inventor: Anil B. Goel, Worthington, Ohio

[73] Assignee: Ashland Oil, Inc., Ashland, Ky.

[21] Appl. No.: 662,754

[22] Filed: Oct. 19, 1984

[51] Int. Cl.$^4$ ............................. C08J 9/08; C08J 9/10
[52] U.S. Cl. ................................... 521/133; 521/136; 521/137; 525/456
[58] Field of Search ..................... 521/136, 137, 133

[56] References Cited

U.S. PATENT DOCUMENTS

| | | | |
|---|---|---|---|
| 3,271,331 | 9/1966 | Ender | 521/136 |
| 4,260,530 | 4/1981 | Reischl et al. | 521/136 |
| 4,461,852 | 7/1984 | Nakamura et al. | 521/136 |
| 4,520,141 | 5/1985 | Kumasaka et al. | 521/136 |

Primary Examiner—Morton Foelak
Attorney, Agent, or Firm—John F. Jones

[57] ABSTRACT

A process for the preparation of improved closed cell foams having improved toughness and improved stability to light by the reaction of a urethane polyol or an amide polyol with a liquid phenol-formaldehyde polyol and a polyisocyanate is described.

8 Claims, No Drawings

PHENOL-FORMALDEHYDE BASED URETHANE FOAMS

This invention relates to a method for the improvement of the physical properties of phenol-formaldehyde based urethane foams by including in their preparation certain amide diols and urethane diols and also pertains to the improved foamed products which result from said method.

Polyurethane foams which are based on phenol-formaldehyde resins are known and are usually associated with brittle surfaces, mold shrinkage, poor light stability and other properties which could advantageously be improved.

It is an object of this invention to provide a process for the preparation of improved phenol-formaldehyde based polyurethane foams which have improved closed cell structure, improved toughness and improved stability to light.

I have discovered that polyurethane foams obtained by the reaction of amide polyols and urethane polyols with a polyisocyanate are tougher, less brittle, have lower shrinkage and improved light stability than those prepared without amide polyols and urethane polyols.

In the process of this invention which can be carried out at about room temperature or above, if desired, urethane polyols of the formula

in which R represents an alkylene group having from 2 to 10 carbon atoms, and R' represents an alkylene group having from 2 to 10 carbon atoms may be used. Amide polyols useful in this invention include those of the formulas

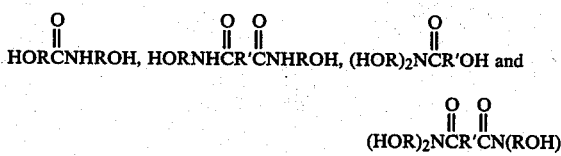

wherein R and R' have the foregoing designations.

The phenol-formaldehyde materials useful in this invention include liquid polyols made by the condensation of phenol and formaldehyde under anhydrous conditions, as is well known to those skilled in the art.

Polyisocyanates useful in this invention include organic isocyanates having at least two isocyanate groups per molecule. The polyisocyanates can be of low, high or intermediate molecular weight and can be any of a wide variety of organic polyisocyanates, including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanate cyclohexane, cyclopentane 1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylylene-1,4-diisocyanate, xylylene-1,3-diisocyanate, 4,4'-diphenylene methane diisocyanate, 1,2,3,4-tetraisocyanato butane, butane 1,2,3-triisocyanate, polymethylene polyphenyl isocyanate, and other polyisocyanates having an isocyanate functionality of at least two as more fully disclosed in U.S. Pat. Nos. 3,350,362 and 3,382,215. Polyisocyanates which are polymeric in nature including isocyanate prepolymers of all types are included in this invention.

Glycol ethers which can be included in the process and compositions of this invention include polypropylene ether diol, polypropylene ether diols capped with ethylene oxide, poly(tetramethylene ether)diol, polyester diols, polypropylene ether triols and the like.

The viscosity of the phenol formaldehyde materials can be decreased for easier handling by including up to to 50% by weight of a glycol such as tripropylene glycol, polypropylene ether diol capped with ethylene oxide and the like.

The blowing agents used in my process include any of the well known materials used for this purpose such as nitrogen, carbon dioxide, fluorinated hydrocarbons, and the like.

My invention is further illustrated in the following examples.

EXAMPLE 1

Six grams of a liquid phenol-formaldehyde resin containing 25% by weight of tripropylene glycol were mixed with 2.3 g of polypropylene ether diol having an hydroxyl equivalent weight of 980.5 (Pluracol 226 from BASF) and 1.15 g of the diamide diol having the formula

in which R is $-(CH_2)-_2$ and R' is $-(CH_2)-_n$ where n=2,3 and 4. The resulting mixture was then thoroughly mixed at about 50° C. to give a clear, viscous liquid. The resulting mixture was then brought to room temperature and there was added to the mixture 0.28 g of silicone surfactant 0.05 g of a solution of triethylene diamine in dimethyl ethanolamine (catalyst) and 3.0 g of a fluorinated hydrocarbon (Freon 11B from DuPont) blowing agent and the resulting mixture was stirred and then 10 g of 4,4' methylene-bis-phenyl isocyanate in liquid form was added and stirring was continued for a few seconds. The mixture underwent foaming and polymerization and a cream time of 20 seconds was observed, a rise time of 50 seconds was observed and the foam reached the tack free stage in 90 seconds. The resulting foam was found to have fine closed cells and had almost no fragile surface or shrinkage. The foam was found to have a density of 2.1 pounds/cubic foot, a closed cell content of 35%, and a compression resistance of 11 pounds per in.[2]. When the foam was exposed to room light for more than 4 months, no observable yellowing of the foam occurred.

EXAMPLE 2

This Example is included for comparison purposes and is not included within the scope of this invention.

The procedure of Example 1 was repeated except that no amide diol was used. The foaming resulted in a foam having a density of 2.27 pounds per cubic foot but the closed cell content was only 19% and the compression resistance was 4.5–5 pounds per in.[2]. The foam was fragile at the surface, higher mold shrinkage had occurred and it turned yellow in room light after 4 months.

EXAMPLE 3

The procedure of Example 1 was followed except that the diamide diol used was a mixture in which R was $C_2$, $C_3$ and $C_4$. The foam which resulted was found to have a density of 2.16 cubic feet, a closed cell content of 25% and a compression resistance of 9 pounds per square inch.

EXAMPLE 4

To 8.8 g of the amide diol,

was added 5 g of tetraol (PEP-450 from BASF). To the mixture was added 0.3 g of a surfactant, a drop of dibutyl tin dilaurate catalyst and 2.3 g of freon F-113 (fluorinated hydrocarbon blowing agent). To this blend was added 22 g of methylene bis-phenyl isocyanate. A vigorous reaction proceeded to give foam having the following properties:

Cream time—25 seconds
Rise time—58 seconds
Tack free—98 seconds
Foam density—3.8 pounds/cubic foot
Closed cell content—71%
Compression resistance—40 pounds per in.$^2$

I claim:

1. The process for preparing phenol-formaldehyde based polyurethane foams having improved closed-cell structure, improved toughness, and improved stability to light comprising reacting a urethane polyol or an amide polyol, a liquid phenol-formaldehyde polyol and a polyisocyanate in the presence of a blowing agent.

2. The process of claim 1 wherein the urethane polyol has the formula

in which R represents an alkylene group having from 2 to 10 carbon atoms and R' represents an alkylene group having from 2 to 10 carbon atoms and the amide polyol has one of the formulas

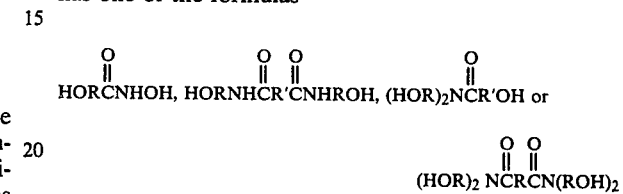

wherein R and R' have the foregoing designations.

3. The process of claim 2 wherein the polyisocyanate is a diisocyanate.

4. The process of claim 3 wherein there is also included a glycol ether.

5. The process of claim 4 wherein a urethane polyol is used.

6. The process of claim 4 wherein an amide polyol is used.

7. A foam prepared by the process of claim 1.

8. A foam prepared by the process of claim 2.

* * * * *